US012400571B2

(12) United States Patent
Jhan et al.

(10) Patent No.: US 12,400,571 B2
(45) Date of Patent: Aug. 26, 2025

(54) ADJUSTMENT METHOD OF SCREEN BRIGHTNESS

(71) Applicant: Qisda Corporation, Taoyuan (TW)

(72) Inventors: Yi-Zong Jhan, Taoyuan (TW); Tse-Wei Fan, Taoyuan (TW); Chun-Chang Wu, Taoyuan (TW); Jen-Hao Liao, Taoyuan (TW); Wei-Yu Chen, Taoyuan (TW); Feng-Lin Chen, Taoyuan (TW); Fu-Tsu Yen, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 18/408,634

(22) Filed: Jan. 10, 2024

(65) Prior Publication Data

US 2024/0379035 A1 Nov. 14, 2024

(30) Foreign Application Priority Data

May 10, 2023 (CN) ......................... 202310523324.2

(51) Int. Cl.
*G09G 3/20* (2006.01)

(52) U.S. Cl.
CPC ....... *G09G 3/20* (2013.01); *G09G 2320/0247* (2013.01); *G09G 2320/0626* (2013.01); *G09G 2320/08* (2013.01); *G09G 2340/0435* (2013.01); *G09G 2354/00* (2013.01)

(58) Field of Classification Search
CPC ............. G09G 3/20; G09G 2320/0247; G09G 2320/0626; G09G 2320/08; G09G 2340/0435; G09G 2354/00
USPC .......................................................... 345/690
See application file for complete search history.

(56) References Cited

U.S. PATENT DOCUMENTS

| | | | | |
|---|---|---|---|---|
| 2004/0257325 A1* | 12/2004 | Inoue | G09G 3/3648 | 345/89 |
| 2016/0125785 A1* | 5/2016 | Wang | G09G 3/3648 | 345/582 |
| 2019/0317369 A1* | 10/2019 | Chen | G02F 1/13452 | |
| 2020/0348750 A1* | 11/2020 | Selan | G09G 3/3426 | |
| 2022/0223105 A1* | 7/2022 | Xia | G09G 3/3208 | |
| 2022/0270547 A1* | 8/2022 | Foo | G09G 3/3208 | |

(Continued)

FOREIGN PATENT DOCUMENTS

| | | | | |
|---|---|---|---|---|
| CN | 111640390 A | 9/2020 | | |
| WO | WO-2023211460 A1 * | 11/2023 | G09G 3/3233 | |

*Primary Examiner* — Kwin Xie

(57) ABSTRACT

An adjustment method of screen brightness comprises the following steps. Step (a): obtaining a relationship between a brightness and refresh rate of the screen. Step (b): adjusting the screen to a highest refresh rate and displaying an image at a first brightness. Step (c): decreasing the first brightness by a unit brightness value and variably displaying the image between a first refresh rate and a second refresh rate. Step (d): determining whether the image does not flicker; if not, repeating step (c). Step (e): calculating a first brightness difference between a decreased brightness of the screen and a brightness corresponding to a lowest refresh rate when the image does not flicker. Step (f): determining whether the first brightness difference is less than a screen flicker threshold; if yes, decreasing the first brightness corresponding to the highest refresh rate to obtain an adjusted brightness corresponding to the highest refresh rate.

15 Claims, 4 Drawing Sheets

(56) References Cited

U.S. PATENT DOCUMENTS

| | | | | |
|---|---|---|---|---|
| 2023/0410751 | A1* | 12/2023 | He ........................ | G09G 3/3233 |
| 2024/0087494 | A1* | 3/2024 | Wen ..................... | G09G 3/2011 |
| 2024/0221576 | A1* | 7/2024 | Huang ................. | G09G 3/2007 |

* cited by examiner

ADJUSTMENT METHOD OF SCREEN BRIGHTNESS

This application claims the benefit of People's Republic of China application Serial No. 202310523324.2, filed on May 10, 2023. The contents of this application are incorporated herein by reference.

TECHNICAL FIELD

The invention relates to an adjustment method of screen brightness.

BACKGROUND

The refresh rate of a screen of a monitor with a particular function may change in accordance with to the frame rate outputted by a graphics card. When the refresh rate changes more rapidly, the user may easily notice a flickering of the screen, thereby making the user feel dizzy or have a poor experience.

As such, the way to solve the flickering of the screen leading to a poor user experience is what those skilled in the art strive to achieve.

SUMMARY

The invention is directed to provide an adjustment method of screen brightness, in order to mitigate users' sensitivity to the flickering of the screen, thereby enhancing the user experience.

According to a first aspect of the invention, an adjustment method of screen brightness comprises the following steps. Step (a): obtaining a relationship between a brightness of a screen and a refresh rate of the screen. Step (b): adjusting the screen to a highest refresh rate, and displaying an image at a first brightness. Step (c): decreasing the first brightness of the screen by a unit brightness value, and variably displaying the image between a first refresh rate and a second refresh rate. Step (d): determining whether the image does not flicker; if not, repeating the step (c). Step (e): calculating a first brightness difference between a decreased brightness of the screen and a brightness corresponding to a lowest refresh rate of the screen when the image does not flicker. Step (f): determining whether the first brightness difference is less than a screen flicker threshold; if yes, decreasing the first brightness corresponding to the highest refresh rate to obtain an adjusted brightness corresponding to the highest refresh rate.

According to a second aspect of the invention, another adjustment method of screen brightness comprises the following steps. step (a): obtaining a relationship between a brightness of a screen and a refresh rate of the screen. Step (b): adjusting the screen to a lowest refresh rate, and displaying an image at a first brightness. Step (c): increasing the first brightness of the screen by a unit brightness value, and variably displaying the image between a first refresh rate and a second refresh rate. Step (d): determining whether the image does not flicker; if not, repeating the step (c). Step (e): calculating a first brightness difference between an increased brightness of the screen and a brightness corresponding to a highest refresh rate of the screen when the image does not flicker. Step (f): determining whether the first brightness difference is less than a screen flicker threshold; if yes, increasing the first brightness corresponding to the lowest refresh rate to obtain an adjusted brightness corresponding to the lowest refresh rate.

These and other objectives of the present invention will no doubt become obvious to those of ordinary skill in the art after reading the following detailed description of the preferred embodiment that is illustrated in the various figures and drawings.

DETAILED DESCRIPTION

A clear and complete description of the technical content in the embodiments of the present invention will be provided below, in conjunction with the drawings in the embodiments of the present invention. Clearly, the described embodiments are a part of the embodiments of the present invention and not the entire embodiments.

Figure 1:
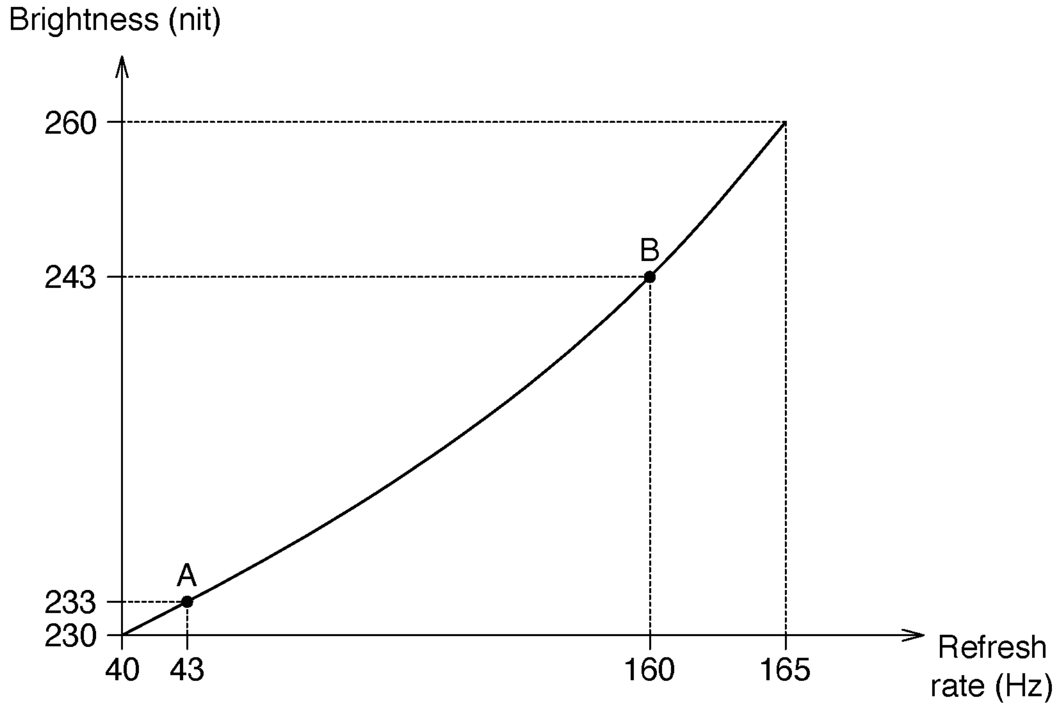
FIG. 1 is a diagram illustrating a relationship between a brightness of a screen and a refresh rate of the screen.

Referring to FIG. 1, FIG. 1 illustrates a diagram d illustrating a relationship between a brightness of a screen and a refresh rate of the screen. In a screen with a function such as Free-sync, the screen itself includes a panel and a backlight module. The refresh rate displayed on the panel is linked to the frame rate of the graphics card, thereby achieving synchronization between the screen and the output content of the graphics card. The backlight module may synchronize with the displaying of the panel by V-sync, simultaneously changing the frequency providing signals to the backlight module and determining the brightness of the screen. As shown in FIG. 1, when the refresh rate of such the kind of screen changes, the corresponding brightness of the screen also changes, exhibiting a positive correlation. For example, a point A in FIG. 1 corresponds to a frequency of 43 Hertz (Hz) and a brightness of 233 nits, and a point B corresponds to a frequency of 160 Hz and a brightness of 243 nits. When the refresh rate changes rapidly, such as the transition from the point B to the point A, a brightness change of 10 nits occurs, which may result in the user noticing screen flicker.

Figure 2A:
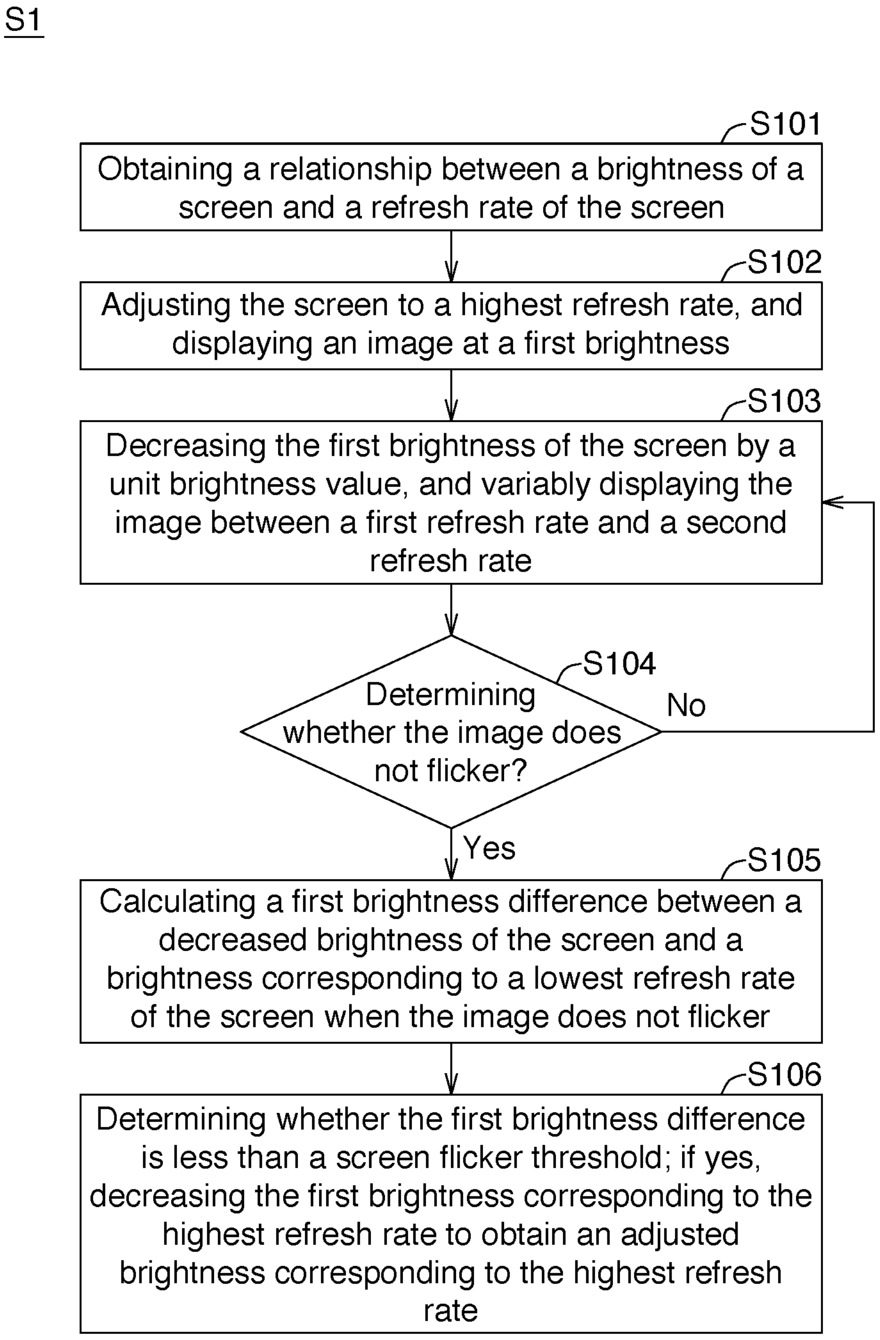
FIG. 2A to FIG. 2B are flowcharts illustrating an adjustment method of screen brightness according to an embodiment of the present invention.
Figure 2B:
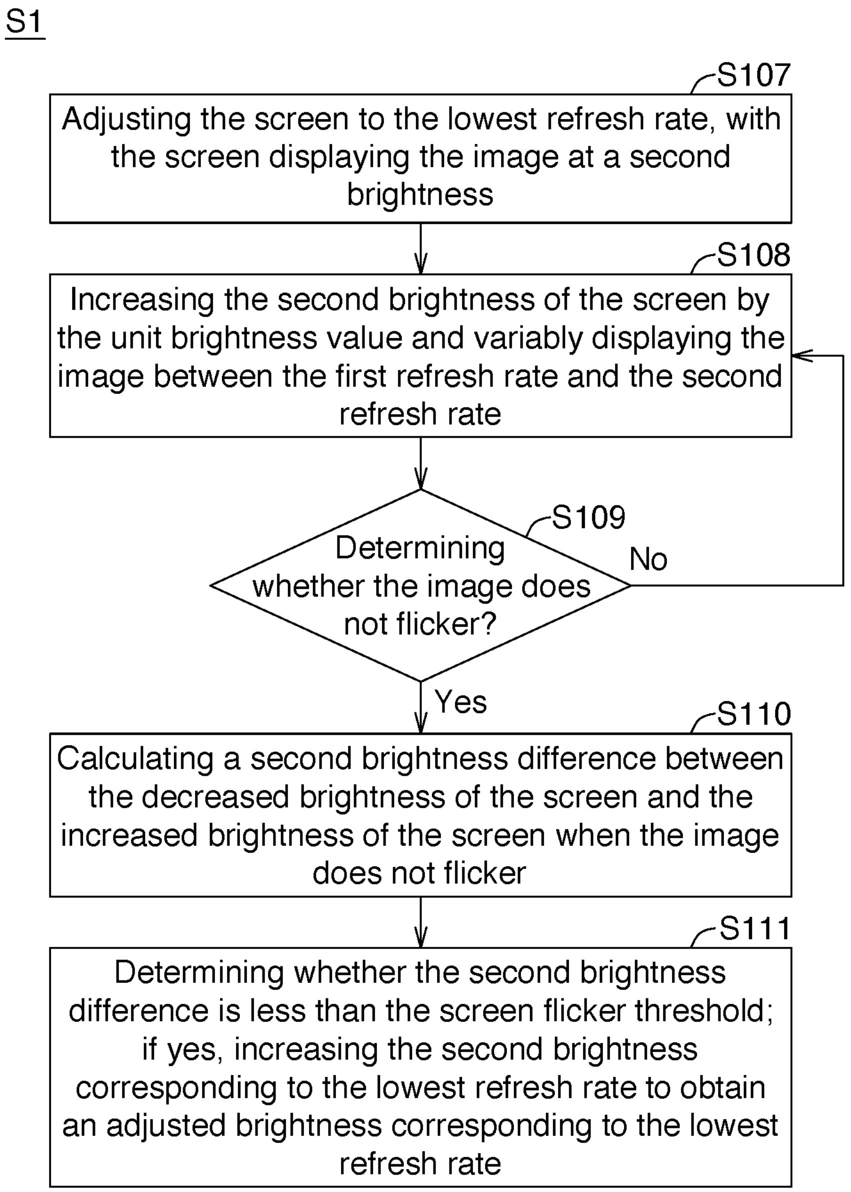

Referring to FIG. 2A to FIG. 2B, FIG. 2A and FIG. 2B illustrate flowcharts of an adjustment method S1 of screen brightness according to an embodiment of the present invention. The adjustment method S1 is used to alleviate the user's perception of flicker caused by changes in the refresh rate, thereby enhancing the user experience. The adjustment method S1 may include the following steps S101 to S106.

In step S101, obtain a relationship between a brightness of a screen and a refresh rate of the screen. Said screen may be provided with a function such as Free-sync or V-sync. Said relationship may be the diagram as shown in FIG. 1.

In step S102, adjust the screen to a highest refresh rate, wherein the screen displays an image at a first brightness. For example, if the highest refresh rate of the screen is 165 Hz as shown in FIG. 1, the first brightness of the screen displaying the image may correspondingly be 260 nits.

In step S103, decrease the first brightness of the screen by a unit brightness value and variably display the image between a first refresh rate and a second refresh rate. The unit brightness value is an adjustable α value, such as set to 3 nits. The first refresh rate may be but not limited to the lowest refresh rate of the screen being 40 Hz as shown in FIG. 1. The second refresh rate may be but not limited to the highest refresh rate of the screen being 165 Hz as shown in FIG. 1. Thus, the first brightness of 260 nits can be progressively decreased in increments of the α value of 3 nits, while variably displaying the image between 40 Hz and 165 Hz.

In step S104, determine whether the image does not flicker; if not, repeat the step S103. For example, after decreasing the brightness of 260 nits in increments of 3 nits nine times to obtain a brightness of 233 nits, it is determined that there is only a 3-nit brightness difference between the obtained brightness of 233 nits and the brightness of 230 nits corresponding to 40 Hz. The 3-nit brightness difference makes the perception of flicker caused by image changes less noticeable to the user, and it can be determined that the image is considered as not flickering. Conversely, if the brightness difference between the obtained decreased brightness and the brightness corresponding to 40 Hz is significant, then repeating step S103 to continue decreasing the first brightness of the screen.

In step S105, calculate the first brightness difference between the decreased brightness of the screen and the brightness corresponding to the lowest refresh rate when the image does not flicker. For example, when the image does not flicker, the decreased brightness of the screen is 233 nits as mentioned previously, and the lowest refresh rate of the screen is 40 Hz as shown in FIG. 1 with a corresponding brightness of 230 nits. Therefore, the calculated first brightness difference is 3 nits.

In step S106, determine whether the first brightness difference is less than a screen flicker threshold; if yes, decrease the first brightness corresponding to the highest refresh rate to obtain an adjusted brightness corresponding to the highest refresh rate. The screen flicker threshold is an adjustable β value, such as set to 5 nits. As such, the previous calculated first brightness difference of 3 nits is less than the set screen flicker threshold (5 nits). The first brightness (260 nits) corresponding to the highest refresh rate (165 Hz) may be decreased to 233 nits as the adjusted brightness, so as to prevent the difference between the adjusted brightness (233 nits) and the brightness (230 nits) corresponding to the lowest refresh rate (40 Hz) from being greater than the screen flicker threshold (5 nits).

In an embodiment of the adjustment method S1, the first brightness of the screen may be, but not limited to, progressively decreased via a user interface (UI) in increments of the unit brightness value until the first brightness difference is less than the screen flicker threshold. In other words, the user is allowed to progressively decrease the first brightness of the screen (such as by decrease the α value each time) until the difference between the decreased brightness and the brightness corresponding to the lowest refresh rate is less than the β value.

In another embodiment of the adjustment method S1, the first brightness of the screen may be, but not limited to, progressively decreased via an automation program (such as a programmable software) in increments of the unit brightness value until the first brightness difference is less than the screen flicker threshold. In other words, a software is used to automatically and progressively decrease the first brightness of the screen (such as by decrease the α value each time) until the difference between the decreased brightness and the brightness corresponding to the lowest refresh rate is less than the β value.

Moreover, in an implementation for the adjusted brightness of the screen, the following approach may be further employed: dividing a difference between the decreased brightness and the first brightness into a first difference and a second difference; decreasing the first brightness corresponding to the highest refresh rate by the first difference to obtain an adjusted brightness corresponding to the highest refresh rate; and increasing the brightness corresponding to the lowest refresh rate by the second difference to obtain an adjusted brightness corresponding to the lowest refresh rate.

In the aforementioned example regarding the adjustment method S1, the difference between the decreased brightness (233 nits) and the first brightness (260 nits) of the screen displaying the image is 27 nits. The first difference may be greater than the second difference. For example, 27 nits can be divided into 17 nits as the first difference and 10 nits as the second difference, then decrease the first brightness (260 nits) corresponding to the highest refresh rate by 17 nits to be 243 nits; and increase the brightness corresponding to the lowest refresh rate (230 nits) by 10 nits to be 240 nits. Consequently, the brightness difference (3 nits) between the adjusted brightness (243 nits) corresponding to the highest refresh rate and the adjusted brightness (240 nits) corresponding to the lowest refresh rate remains being less than the screen flicker threshold (i.e. β value set to 5 nits).

Additionally, the first difference may be less than the second difference. For example, 27 nits can be divided into 10 nits as the first difference and 17 nits as the second difference, then decrease the first brightness (260 nits) corresponding to the highest refresh rate by 10 nits to be 250 nits; and increase the brightness (230 nits) corresponding to the lowest refresh rate by 17 nits to be 247 nits. Consequently, the brightness difference (3 nits) between the adjusted brightness (250 nits) corresponding to the highest refresh rate and the adjusted brightness (247 nits) corresponding to the lowest refresh rate remains being less than the screen flicker threshold (i.e. β value set to 5 nits).

Furthermore, the first difference may also be equal to the second difference. For example, 27 nits can be divided into 13.5 nits as the first difference and 13.5 nits as the second difference, then decrease the first brightness (260 nits) corresponding to the highest refresh rate by 13.5 nits to be 246.5 nits; and increase the brightness (230 nits) corresponding to the lowest refresh rate by 13.5 nits to be 243.5 nits. Consequently, the brightness difference (3 nits) between the adjusted brightness (246.5 nits) corresponding to the highest refresh rate and the adjusted brightness (243.5 nits) corresponding to the lowest refresh rate remains being less than the screen flicker threshold (i.e. β value set to 5 nits).

As such, it should be understood that the present invention can adjust the brightness corresponding to the highest refresh rate and the brightness corresponding to the lowest refresh rate together, ensuring that the difference between them remains being less than the screen flicker threshold, thereby making the user's perception of flicker caused by image changes less apparent.

As shown in FIG. 2B, the brightness adjustment method S1 can further include the following steps S107 to S111. In step S107, adjust the screen to the lowest refresh rate, with the screen displaying the image at a second brightness. In the example mentioned previously, the lowest refresh rate of the screen is 40 Hz as shown in FIG. 1, and the second brightness corresponding to the image displayed on the screen is 230 nits.

In step S108, increase the second brightness of the screen by the unit brightness value, and variably displaying the image between the first refresh rate and the second refresh rate. As mentioned previously, the unit brightness value is an adjustable α value, such as set to 3 nits. The first refresh rate can be, but is not limited to, the lowest refresh rate of the screen of 40 Hz as shown in FIG. 1. The second refresh rate can be, but is not limited to, the highest refresh rate of the screen of 165 Hz as shown in FIG. 1. That is, the second brightness of the screen of 230 nits can be increased in increments of the α value of 3 nits, while variably displaying the image between 40 Hz and 165 Hz. In other words, when the adjustment method S1 includes the steps shown in FIG. 2B, the decreasing adjustment of the first brightness by the unit brightness value and the increasing adjustment of the second brightness by the unit brightness value are carried out in parallel. This can be done in an alternating manner, for example, by first decreasing the first brightness (260 nits) of the screen by the α value (3 nits) to 257 nits, and then increasing the second brightness (230 nits) of the screen by the α value (3 nits) to 233 nits. This gradually brings the brightness corresponding to the highest refresh rate closer to the brightness corresponding to the lowest refresh rate, thereby reducing the brightness difference between those two.

In step S109, determine whether the image does not flicker; if not, repeating the step S108. For example, if the first brightness is decreased 5 times to obtain a decreased brightness of 245 nits and the second brightness is increased 4 times to obtain an increased brightness of 242 nits, it can be determined that there is only a 3-nit brightness difference between them, making the flicker caused by image changes less noticeable. This is considered as the image not flickering. On the contrary, if there is a significant brightness difference between them (e.g., the second brightness is not increased enough times), the step S108 is repeated to continue increasing the second brightness of the screen.

In step S110, calculating a second brightness difference between the decreased brightness of the screen and the increased brightness of the screen when the image does not flicker. For example, when the image does not flicker, the decreased brightness of the screen, as mentioned previously, is 245 nits, and the increased brightness is 242 nits, so the second brightness difference is calculated as 3 nits.

In step S111, determine whether the second brightness difference is less than the screen flicker threshold; if yes, increasing the second brightness corresponding to the lowest refresh rate to obtain an adjusted brightness corresponding to the lowest refresh rate. As mentioned previously, the screen flicker threshold is an adjustable α value, such as set to 5 nits. Based on the previously calculated second brightness difference of 3 nits, which is less than the set screen flicker threshold (β value set to 5 nits), the second brightness corresponding to the lowest refresh rate (40 Hz) originally being 230 nits can be increased to 242 nits as the adjusted brightness.

In summary, the steps shown in FIG. 2B illustrates that the adjustment method S1 of the present invention is able to decrease the first brightness by the unit brightness value and increase the second brightness by the unit brightness value in parallel, aiming to obtain the brightness corresponding to the highest refresh rate and the lowest refresh rate with lower perceptibility of flicker.

Figure 3:
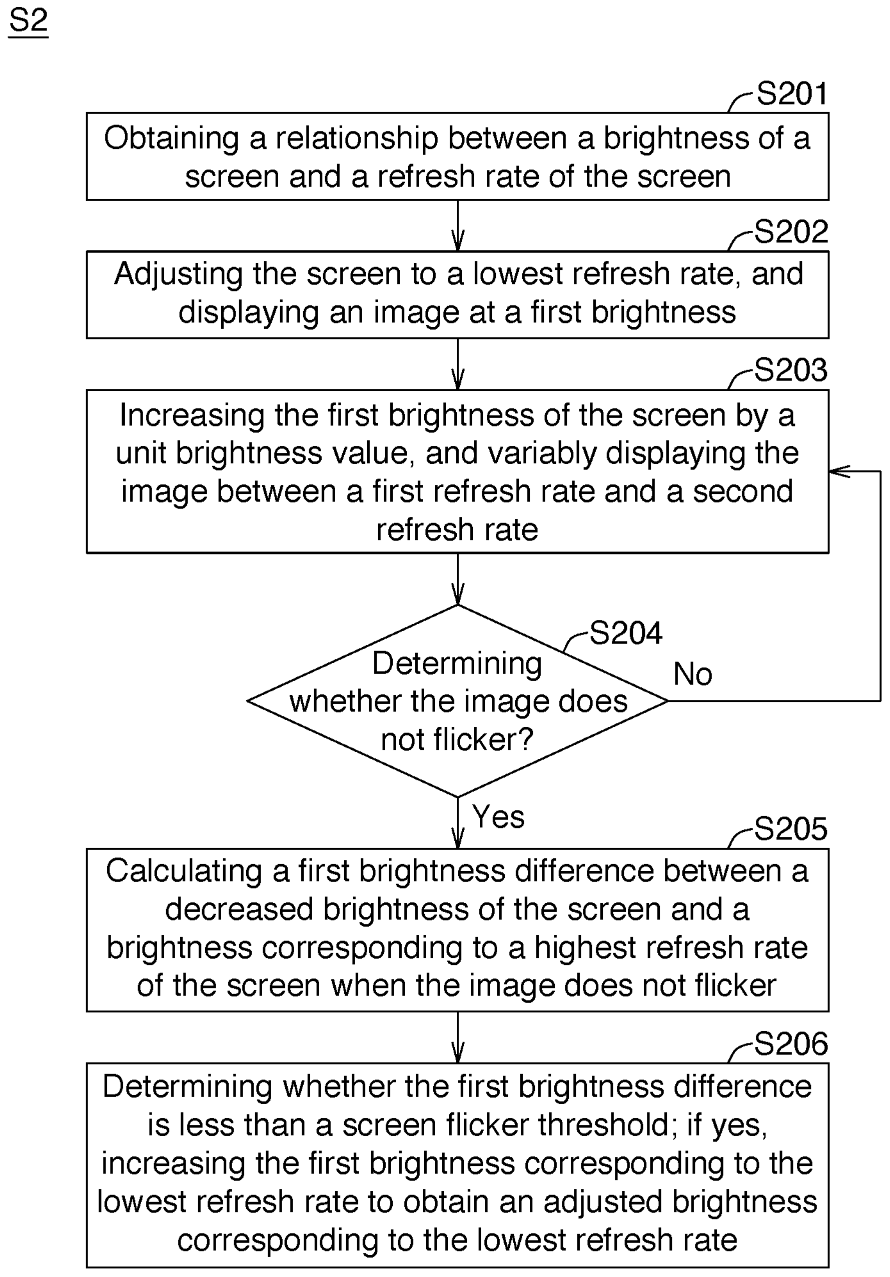
FIG. 3 is a flowchart illustrating an adjustment method of screen brightness according to another embodiment of the present invention.

Referring to FIG. 3, FIG. 3 is a flowchart illustrating an adjustment method S2 of screen brightness according to another embodiment of the present invention. Similarly, the adjustment method S2 can be used to alleviate the user's perception of flicker caused by changes in the refresh rate, thereby enhancing the user experience. In contrast to the adjustment method S1 described previously that is related to decrease the brightness when displaying images at the highest refresh rate to obtain an adjusted brightness corresponding to the highest refresh rate, the adjustment method S2 is related to increase the brightness when displaying images at the lowest refresh rate to obtain an adjusted brightness corresponding to the lowest refresh rate. The adjustment method S2 may include the following steps S201 to S206.

In step S201, obtain a relationship between a brightness of a screen and a refresh rate of the screen. Said screen may be provided with a function such as Free-sync or V-sync. Said relationship may be the diagram as shown in FIG. 1.

In step S202, adjust the screen to a lowest refresh rate, wherein the screen displays an image at a first brightness. For example, if the lowest refresh rate of the screen is 40 Hz as shown in FIG. 1, the first brightness of the screen displaying the image may correspondingly be 230 nits.

In step S203, decrease the first brightness of the screen by a unit brightness value and variably display the image between a first refresh rate and a second refresh rate. The unit brightness value is an adjustable α value, such as set to 3 nits. The first refresh rate may be but not limited to the lowest refresh rate of the screen being 40 Hz as shown in FIG. 1. The second refresh rate may be but not limited to the highest refresh rate of the screen being 165 Hz as shown in FIG. 1. Thus, the first brightness of 230 nits can be progressively increased in increments of the α value of 3 nits, while variably displaying the image between 40 Hz and 165 Hz.

In step S204, determine whether the image does not flicker; if not, repeat the step S203. For example, after increasing the brightness of 230 nits in increments of 3 nits nine times to obtain a brightness of 257 nits, it is determined that there is only a 3-nit brightness difference between the obtained brightness of 257 nits and the brightness of 260 nits corresponding to 165 Hz. The 3-nit brightness difference makes the perception of flicker caused by image changes less noticeable to the user, and it can be determined that the image is considered as not flickering. Conversely, if the brightness difference between the obtained increased brightness and the brightness corresponding to 165 Hz is significant, then repeating step S203 to continue increasing the first brightness of the screen.

In step S205, calculate the first brightness difference between the increased brightness of the screen and the brightness corresponding to the highest refresh rate when the image does not flicker. For example, when the image does not flicker, the increased brightness of the screen is 257 nits as mentioned previously, and the highest refresh rate of the screen is 165 Hz as shown in FIG. 1 with a corresponding brightness of 260 nits. Therefore, the calculated first brightness difference is 3 nits.

In step S206, determine whether the first brightness difference is less than a screen flicker threshold; if yes, increase the first brightness corresponding to the lowest refresh rate to obtain an adjusted brightness corresponding to the lowest refresh rate. The screen flicker threshold is an adjustable β value, such as set to 5 nits. As such, the previous calculated first brightness difference of 3 nits is less than the set screen flicker threshold (5 nits). The first brightness (230 nits) corresponding to the lowest refresh rate (40 Hz) may be increased to 257 nits as the adjusted brightness, so as to prevent the difference between the adjusted brightness (257 nits) and the brightness (260 nits) corresponding to the highest refresh rate (165 Hz) from being greater than the screen flicker threshold (5 nits).

Similar to the features of the adjustment method S1, in an embodiment of the adjustment method S2, the first brightness of the screen may be, but not limited to, progressively decreased via a user interface (UI) in increments of the unit brightness value until the first brightness difference is less than the screen flicker threshold. Further, in another embodiment of the adjustment method S2, the first brightness of the screen may be, but not limited to, progressively decreased via an automation program (such as a programmable software) in increments of the unit brightness value until the first brightness difference is less than the screen flicker threshold.

Similar to the features of the adjustment method S1, in an implementation for the adjusted brightness of the screen in the adjustment method S2, the following approach may be further employed: dividing a difference between the increased brightness and the first brightness into a first difference and a second difference; decreasing the first brightness corresponding to the highest refresh rate by the first difference to obtain an adjusted brightness corresponding to the highest refresh rate; and increasing the brightness corresponding to the lowest refresh rate by the second difference to obtain an adjusted brightness corresponding to the lowest refresh rate.

In the aforementioned example regarding the adjustment method S2, the difference between the increased brightness (257 nits) and the first brightness (230 nits) of the screen displaying the image is 27 nits. The first difference may be greater than the second difference. For example, 27 nits can be divided into 17 nits as the first difference and 10 nits as the second difference, then decrease the first brightness (260 nits) corresponding to the highest refresh rate by 17 nits to be 243 nits; and increase the brightness corresponding to the lowest refresh rate (230 nits) by 10 nits to be 240 nits. Consequently, the brightness difference (3 nits) between the adjusted brightness (243 nits) corresponding to the highest refresh rate and the adjusted brightness (240 nits) corresponding to the lowest refresh rate remains being less than the screen flicker threshold (i.e. β value set to 5 nits).

Additionally, the first difference may be less than the second difference. For example, 27 nits can be divided into 10 nits as the first difference and 17 nits as the second difference, then decrease the first brightness (260 nits) corresponding to the highest refresh rate by 10 nits to be 250 nits; and increase the brightness (230 nits) corresponding to the lowest refresh rate by 17 nits to be 247 nits. Consequently, the brightness difference (3 nits) between the adjusted brightness (250 nits) corresponding to the highest refresh rate and the adjusted brightness (247 nits) corresponding to the lowest refresh rate remains being less than the screen flicker threshold (i.e. β value set to 5 nits).

Furthermore, the first difference may also be equal to the second difference. For example, 27 nits can be divided into 13.5 nits as the first difference and 13.5 nits as the second difference, then decrease the first brightness (260 nits) corresponding to the highest refresh rate by 13.5 nits to be 246.5 nits; and increase the brightness (230 nits) corresponding to the lowest refresh rate by 13.5 nits to be 243.5 nits. Consequently, the brightness difference (3 nits) between the adjusted brightness (246.5 nits) corresponding to the highest refresh rate and the adjusted brightness (243.5 nits) corresponding to the lowest refresh rate remains being less than the screen flicker threshold (i.e. β value set to 5 nits).

In summary, the adjustment methods provided in the above-mentioned embodiments can achieve: obtaining a desired brightness regarded as flicker-free by decreasing the brightness at which an image is displayed by the screen at the highest refresh rate and adjusting the brightness corresponding to the highest refresh rate to approximate the brightness corresponding to the lowest refresh rate; obtaining a desired brightness regarded as flicker-free by increasing the brightness at which an image is displayed by the screen at the lowest refresh rate and adjusting the brightness corresponding to the lowest refresh rate to approximate the brightness corresponding to the highest refresh rate; or obtaining a desired brightness regarded as flicker-free by decreasing the brightness at which an image is displayed by the screen at the highest refresh rate and parallel increasing the brightness at which an image is displayed by the screen at the lowest refresh rate to bring the brightness corresponding to two extreme refresh rate close. As such, the user's perception of flicker caused by changes in the refresh rate can be alleviated, thereby enhancing the user experience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An adjustment method of screen brightness, comprising:

step (a): obtaining a relationship between a brightness of a screen and a refresh rate of the screen;

step (b): adjusting the screen to a highest refresh rate, and displaying an image at a first brightness;

step (c): decreasing the first brightness of the screen by a unit brightness value, and variably displaying the image between a first refresh rate and a second refresh rate;

step (d): determining whether the image does not flicker; when not, repeating the step (c);

step (e): calculating a first brightness difference between a decreased brightness of the screen and a brightness corresponding to a lowest refresh rate of the screen when the image does not flicker; and step (f): determining whether the first brightness difference is less than a screen flicker threshold; when yes, decreasing the first brightness corresponding to the highest refresh rate to obtain an adjusted brightness corresponding to the highest refresh rate;

wherein the adjustment method of screen brightness further includes:

dividing a difference between the decreased brightness and the first brightness into a first difference and a second difference;

decreasing the first brightness corresponding to the highest refresh rate by the first difference to obtain an adjusted brightness corresponding to the highest refresh rate, while simultaneously increasing the brightness corresponding to the lowest refresh rate by the second difference to obtain an adjusted brightness corresponding to the lowest refresh rate, wherein the first difference is not equal to the second difference.

2. The adjustment method of screen brightness according to claim 1, wherein the first brightness of the screen is progressively decreased via a user interface in increments of the unit brightness value until the first brightness difference is less than the screen flicker threshold.

3. The adjustment method of screen brightness according to claim 1, wherein the first brightness of the screen is progressively decreased via an automation program in increments of the unit brightness value until the first brightness difference is less than the screen flicker threshold.

4. The adjustment method of screen brightness according to claim 1, wherein the unit brightness value is an adjustable setting.

5. The adjustment method of screen brightness according to claim 1, wherein the first difference is greater than the second difference.

6. The adjustment method of screen brightness according to claim 1, wherein the first difference is less than the second difference.

7. The adjustment method of screen brightness according to claim 1, further comprising:

step (g): adjusting the screen to the lowest refresh rate, with the screen displaying the image at a second brightness;

step (h): increasing the second brightness of the screen by the unit brightness value and variably displaying the image between the first refresh rate and the second refresh rate;

step (i): determining whether the image does not flicker; when not, repeating the step (h);

step (j): calculating a second brightness difference between the decreased brightness of the screen and the increased brightness of the screen when the image does not flicker; and step (k): determining whether the second brightness difference is less than the screen flicker threshold; when yes, increasing the second brightness corresponding to the lowest refresh rate to obtain an adjusted brightness corresponding to the lowest refresh rate.

8. The adjustment method of screen brightness according to claim 1, wherein the brightness of the screen exhibits a positive correlation with the refresh rate of the screen.

9. An adjustment method of screen brightness, comprising:

step (a): obtaining a relationship between a brightness of a screen and a refresh rate of the screen;

step (b): adjusting the screen to a lowest refresh rate, and displaying an image at a first brightness;

step (c): increasing the first brightness of the screen by a unit brightness value, and variably displaying the image between a first refresh rate and a second refresh rate;

step (d): determining whether the image does not flicker; when not, repeating the step (c);

step (e): calculating a first brightness difference between an increased brightness of the screen and a brightness corresponding to a highest refresh rate of the screen when the image does not flicker; and step (f): determining whether the first brightness difference is less than a screen flicker threshold; when yes, increasing the first brightness corresponding to the lowest refresh rate to obtain an adjusted brightness corresponding to the lowest refresh rate;

wherein, the adjustment method of screen brightness further includes:

dividing a difference between the increased brightness and the first brightness into a first difference and a second difference;

increasing the first brightness corresponding to the lowest refresh rate by the first difference to obtain an adjusted brightness corresponding to the lowest refresh rate, while simultaneously decreasing the brightness corresponding to the highest refresh rate by the second difference to obtain an adjusted brightness corresponding to the highest refresh rate, wherein the first difference is not equal to the second difference.

10. The adjustment method of screen brightness according to claim 9, wherein the first brightness of the screen is progressively decreased via a user interface in increments of the unit brightness value until the first brightness difference is less than the screen flicker threshold.

11. The adjustment method of screen brightness according to claim 9, wherein the first brightness of the screen is progressively decreased via an automation program in increments of the unit brightness value until the first brightness difference is less than the screen flicker threshold.

12. The adjustment method of screen brightness according to claim 9, wherein the unit brightness value is an adjustable setting.

13. The adjustment method of screen brightness according to claim 9, wherein the first difference is greater than the second difference.

14. The adjustment method of screen brightness according to claim 9, wherein the first difference is less than the second difference.

15. The adjustment method of screen brightness according to claim 9, wherein the brightness of the screen exhibits a positive correlation with the refresh rate of the screen.

* * * * *